United States Patent [19]

Nishioka

[11] 4,027,541

[45] June 7, 1977

[54] ELECTRONIC COMPONENT HAVING A FINE ADJUSTMENT MECHANISM

[75] Inventor: Matsuo Nishioka, Hirakata, Japan

[73] Assignee: Matsushita Electric Industrial Co., Ltd., Kadoma, Japan

[22] Filed: May 12, 1975

[21] Appl. No.: 576,379

[30] Foreign Application Priority Data

May 14, 1974 Japan ............................. 49-54238
June 28, 1974 Japan ......................... 49-76880[U]

[52] U.S. Cl. .................................. 74/10.54; 74/805
[51] Int. Cl.$^2$ ...................... F16H 35/18; F16H 1/28
[58] Field of Search ............... 74/10.52, 10.54, 805

[56] References Cited

UNITED STATES PATENTS

| | | | |
|---|---|---|---|
| 2,167,677 | 8/1939 | Peterson | 74/10.52 |
| 2,658,395 | 11/1953 | Coates | 74/10.52 |
| 3,192,799 | 7/1965 | Pamplin | 74/805 |
| 3,426,604 | 2/1969 | Weiner | 74/10.54 |
| 3,618,405 | 11/1971 | Ishida | 74/10.54 X |
| 3,618,406 | 11/1971 | Mohri et al. | 74/10.54 |

*Primary Examiner*—Samuel Scott
*Assistant Examiner*—Lance W. Chandler
*Attorney, Agent, or Firm*—Stevens, Davis, Miller & Mosher

[57] ABSTRACT

An electronic component of this invention having a fine adjustment mechanism is applicable to a variable resistor, variable capacitor or the like which requires fine adjustment.

In this electronic component; a drive shaft having an eccentric cam formed thereon is provided. A ring-shaped intermediate reduction member having a power transmitting portion formed on its outer periphery is fitted into the eccentric cam of the drive shaft. The intermediate reduction member is constructed so that it cannot be rotated but is allowed to make an eccentric movement. A reduction rotating member is provided which has a power transmitting portion formed on its inner periphery, linked to a portion of the power transmitting portion of the intermediate reduction member and has a diameter different than that of the intermediate reduction member. An actuating member of the electronic component is coupled to the reduction rotating member.

This electronic component can be provided which is small in size, requires a small number of parts and can provide a large reduction ratio and smooth operation despite use of gears while eliminating backlash.

14 Claims, 18 Drawing Figures

Figure 10:
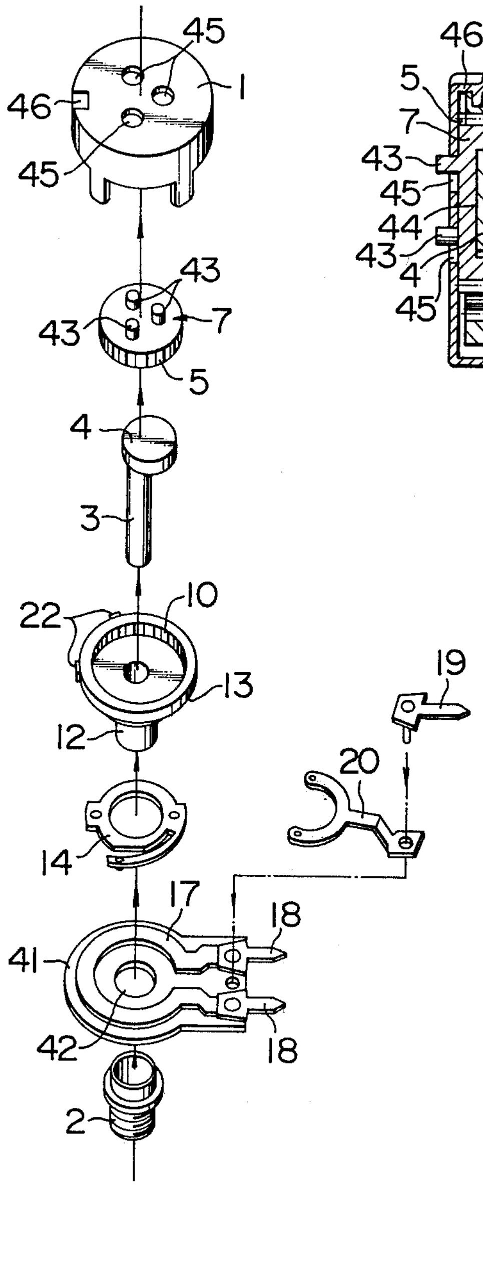

FIG. 3
FIG. 1
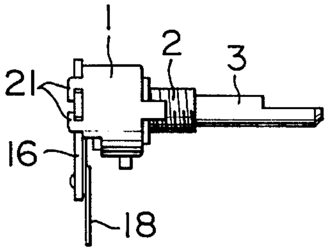
FIG. 2
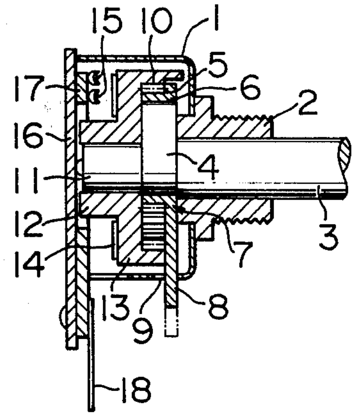
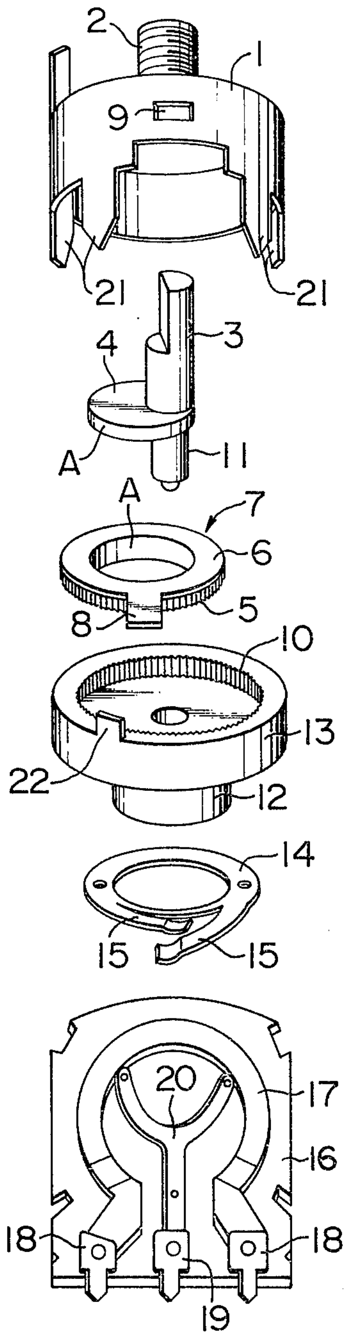

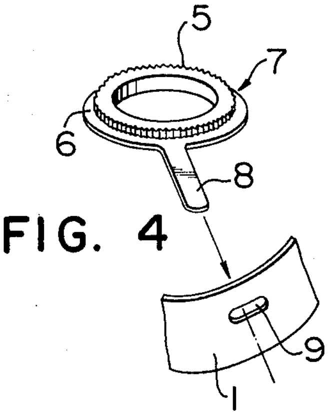
FIG. 4
FIG. 5
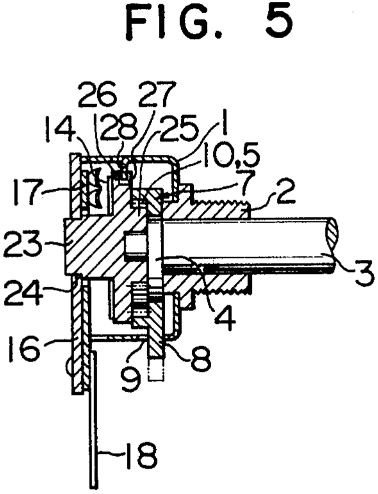
FIG. 6
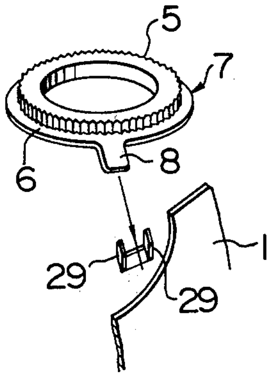
FIG. 7
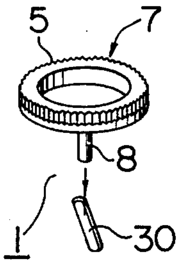
FIG. 8
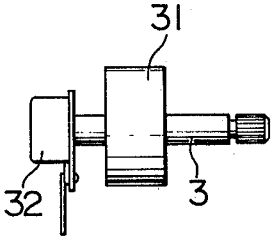

ELECTRONIC COMPONENT HAVING A FINE ADJUSTMENT MECHANISM

The present invention relates to an electronic component with a fine adjustment mechanism applicable to a variable resistor, variable capacitor or the like, which requires fine adjustment.

In the past, as electronic components of this type, those which used reduction gears of the ball vernier type have been known. Such ball vernier type reduction gear required many reduction balls, several shafts and several bearings, thus requiring many elements, which resulted in an increase in size as well as being disadvantageous because of relatively high cost. Further, many other problems such as a requirement for a large operation torque and lack of operational stability were encountered.

The present invention aims to overcome the above disadvantages encountered in the prior art. It is, therefore, an object of the present invention to provide a reduction gear mechanism which is small in size, requires a small number of elements, can afford a relatively large reduction gear ratio and provides smooth operation.

According to the present invention, the reduction gear mechanism can be constructed with a small number of element in a small size and can be assembled with ease, this being very advantageous in accomplishing a saving in resources. In spite of the small size and simple construction, it can provide a large reduction ratio and can operate very smoothly. No backlash exists in spite of the inclusion of gears and hence the mechanism provides excellent operability.

According to the present invention, a plurality of projections are provided in the reduction gears and they are fitted into bores in a case so that the projections and the bores cause an eccentric movement of the reduction gears. As a result, the rotation of an operation shaft can be uniformly transmitted to a driven member at a reduction gear ratio, and its operation is very stable and of high quality.

According to another aspect of the present invention, a bearing portion of a driven member is mounted externally of a bearing of the mechanism to form a dual shaft together with a drive shaft so that by rotating the bearing portion a fine adjustment can be effected, which together with the fine adjustment attained by the driving shaft facilitates the adjustment operation.

According to a further aspect of the present invention, the bearing portion of the driven member is formed with an indication means so that the amount of rotation of the rotated member which moves asynchronously with the rotation of the driving shaft can be clearly indicated, which in turn allows clear indication of resistance value for a variable resistor or capacitance value for a variable capacitor.

Figure 9:
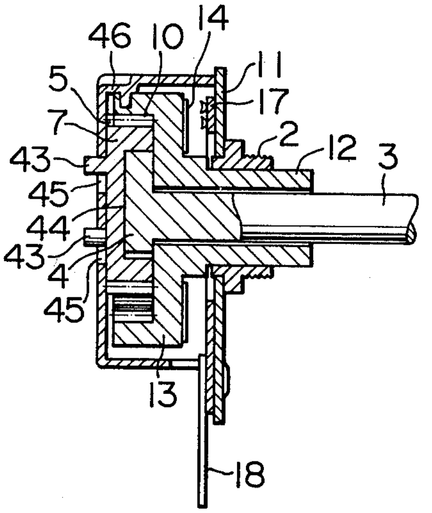
Figure 11:
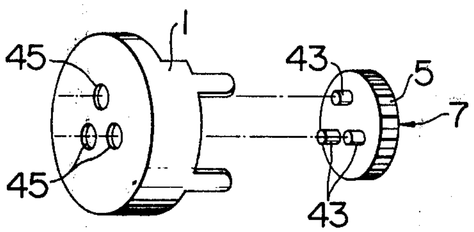
Figure 12A:
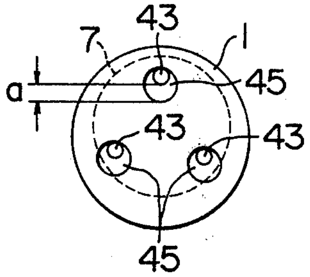
Figure 12B:
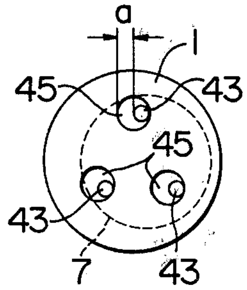
Figure 12C:
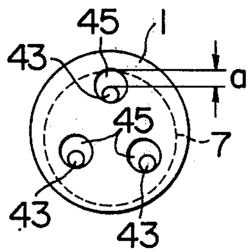
Figure 12D:
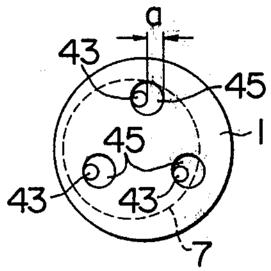
Figure 13A:
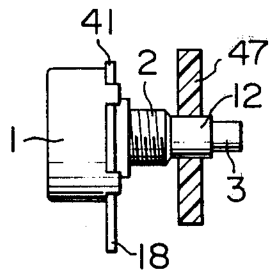
Figure 13B:
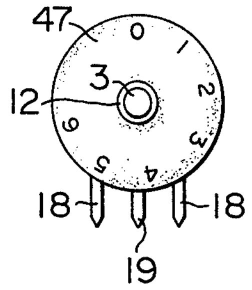
Figure 14:
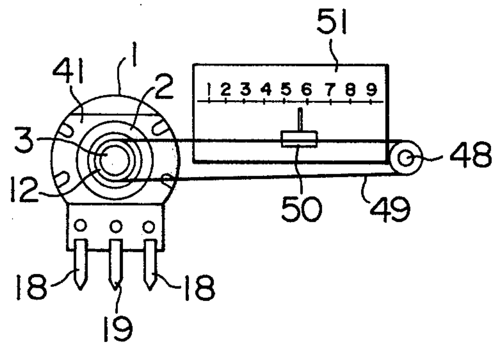

The above and other objects, features and advantages of the present invention will become more apparent from the following detailed description of the preferred embodiment of the present invention when taken in conjunction with the accompanying drawings, in which;

FIG. 1 is a front view showing a first embodiment of an electronic component with a fine adjustment mechanism in accordance with the present invention, FIG. 2 is a cross sectional view thereof, FIG. 3 is an exploded perspective view thereof, FIG. 4 is an exploded perspective view of a major part thereof, FIG. 5 is a cross sectional view showing a second embodiment of the present invention, FIGS. 6 and 7 are exploded perspective views illustrating major parts of the second embodiment, FIG. 8 is a front view illustrating the second embodiment, FIG. 9 is a cross sectional view showing a third embodiment of the electronic component with a fine adjustment mechanism in accordance with the present invention, FIG. 10 is an exploded perspective view thereof, FIG. 11 is an exploded perspective view of a major part thereof, FIGS. 12A through 12D illustrate the operation of the major part, FIGS. 13A and 13B are side and elevational views, partly in section, illustrating a fourth embodiment, and FIG. 14 is a front view illustrating a fifth embodiment.

Referring first to FIGS. 1 to 4, the first embodiment of the present invention is explained. In the illustrated embodiment, a variable resistor is used to explain one of the electronic components.

Numeral 1 designates a case formed in cap shape by a metal sheet or the like, to which case a bearing 2 is secured. Rotatably fitted into the bearing 2 is a driving shaft 3. At that portion of the driving shaft 3 which extends into the case 1, there is mounted an eccentric cam plate 4, to which is fitted a reduction gear 7 serving as an intermediate reduction member, which has a gearing portion 5 and a flange portion 6 on an outer periphery thereof. A projection 8 is formed integrally with the flange 6. The projection 8 is fitted into a guide aperture 9 formed on a side wall of the case 1 in order to prevent rotation of the reduction gear 7 when the drive shaft 3 rotates and to permit only eccentric movement.

On the outer periphery of the reduction gear 7, a reduction rotating member 13 is arranged which is formed with a gearing portion 10 on its inner periphery, and has a stop 22 formed on a portion of a circumferential surface, a bearing 12 formed on its back side, which is adapted to accommodate a member 11 of small diameter at a tip end of the drive shaft 3. The gear portion 10 of the reduction rotating member 13 and the gear portion 5 of the reduction gear 7 engage with each other at one point. That is the inner diameter of the gearing portion 10 of the reduction rotating member 13 is designed to be somewhat larger than the outer diameter of the gearing portion 5 of the reduction gear 7 so that a gap therebetween is covered by the eccentric movement of the reduction gear 7 and a portion of the gearing portion 5 of the reduction gear 7 necessarily engages with the gearing portion 10 of the reduction rotating member 13 during the eccentric movement. Secured on the back of the reduction rotating member 13 is a contactor 14, an end of an arm 15 of which makes contact with a horseshoe-shaped resistor element 17 arranged on a mounting base 16. At opposite ends of the resistive element 17, terminals 18 leading to the exterior are provided. In addition, a contactor 20 electrically connected to a terminal 19 is mounted on the base 16.

The base 16 is coupled and assembled to the case 1 by coupling members 21 formed in the case 1 such that the tip end of the drive shaft 3 abuts against a center portion of the base 16 to prevent play in the shaft and to permit a smooth rotation of the drive shaft 3.

The operation of the mechanism will now be described.

As the drive shaft 3 is rotated, a plane A in which the cam plate 4 of the drive shaft 3 and the reduction gear 7 makes contact; that is, the outer circumferential surface which is farthest from an axial center of the drive shaft 3, traces a circle around the drive shaft 3, and through this movement the reduction gear 7 makes an eccentric movement with the projection 8 fitted into the guide aperture 9 serving as a support point. It is necessary in this case for the projection 8 to move into and out of the guide aperture 9 for the eccentric movement.

By the above operation of the reduction gear 7, the reduction rotating member 13 having the gearing portion 10 which engages with the gearing portion 5 of the reduction gear 7 is rotated. The diameters and the number of teeth of the gearing portion 5 of the reduction gear 7 and of the gearing portion 10 of the reduction rotating member 13 are different. The engaged point of the gearing portions 5 and 10 always lie on the extension of a line connecting an axial center line and the plane A in which the cam plate 4 and the reduction gear 7 make contact. Through this engagement, the eccentric movement of the reduction gear 7 is transmitted to the reduction rotating member 13 as a rotating force therefor. In this manner the rotating force of the drive shaft 3 is transmitted to the reduction transmitting member 13 through the reduction gear 7 such that the reduction rotating member 13 is rotated by 300°, that is, it makes one revolution after 5 – 10 revolutions of the drive shaft 3. Since the stop 22 formed on the reduction rotating member 13 abuts against the projection 8 of the reduction gear 7, the reduction rotating member 13 is prevented from being rotated more than one revolution.

The contactor 14 attached to the reduction rotating member 13 rotated in the manner described above slidably moves on the resistive element 17 on the mounting base 16 to produce a desired resistance value.

The above explanation refers to the embodiment illustrated in FIGS. 1 to 4. A second embodiment illustrated in FIGS. 5 to 8 can also be provided.

The second embodiment shown in FIG. 5 is basically identical to the embodiment described above except that the drive shaft 3 is shortened, and a shaft portion 23 is formed on the reduction rotating member 13, which shaft portion 23 is fitted into a bore 24 at the center of the base 16 to form a rotating section, and the gearing portion 10 is formed on the outer periphery of the projection 25 at a front of the reduction rotating member 13, a stop 27 is provided on the flange 26 at the back side thereof, and an engaging member 28 is formed by stamping a part of the case 1 to restrict the rotation of the reduction rotating member 13, and the reduction gear 7 is formed with the gearing section 5 on the inner periphery thereof having a cap shape.

In the second embodiment shown in FIG. 6, two guide members 29 are formed by partially stamping the case 1 as a guide to the projection 8 of the reduction gear 7 so that the projection 8 can move within the space between the guides 29.

In the second embodiment shown in FIG. 7, the projection 8 is formed on the side wall of the reduction gear 7 and it is inserted into a straight slot 30 in the front side of the case 1.

In the second embodiment shown in FIG. 8, a separate reduction unit 31 is formed by the reduction gear 7, the reduction rotating member 13 etc., and the reduction rotating member 13 is coupled to a conventional variable resistor 32 to form a variable resistor with fine adjustment mechanism. A similar function may be provided when a power transmission mechanism, which uses friction instead of the gearing portions of the reduction gear and the reduction rotating member, is used.

A third embodiment of the present invention is described with reference to FIGS. 9 to 12. In the illustrated embodiment, a variable resistor is used to explain one of the electronic components.

Numeral 41 designates an insulating base of a horseshoe shape which is formed with a hole 42 at a center thereof, having a bearing 2 secured therein. On a periphery of the insulating base 41, a resistive element 17 of a horseshoe shape is formed and terminals 18 are provided at opposite ends of the resistive element 17. Intermediate to the terminals 18, there is provided a terminal 19 which is electrically connected to a contactor 20 secured to the insulating base 41. Fitted into the bearing 2 is a bearing portion 12 of a reduction rotating member 13. A large diameter portion at a tip end of the reduction rotating member 13 is formed with a gearing portion 10.

Arranged in the gearing portion 10 is a reduction gear 7 which engages with the gearing portion 10 at a portion thereof. Gear 7 has a diameter smaller than the inner diameter of the gearing portion 10. The reduction gear 7 has a gearing portion 5 formed on a periphery thereof, which engages with the gearing portion 10, and has three cylindrical projections 43 formed on an upper surface and a circular recess 44 on a lower surface thereof. Fitted into the recess 44 is an eccentric cam plate 4 formed at a tip end of a drive shaft 3 which is fitted into the bearing 12 of the reduction rotating member 7 and rotatably supported thereto. The cam plate 4 always makes contact with a portion of the recess 44 and can rotate freely within the recess 44 so that the reduction gear 7 is caused to make eccentric movement through the above rotation of the cam plate 4. On a top surface of the cap-shaped case 1 which is secured to the insulating base 41 to cover the reduction gear 7 and the reduction rotating member 13, bores 45 are formed, into which the projections 43 on the top surface of the reduction gear 7 are loosely fitted. The diameter of each bore 45 is the space *a* plus the diameter of the projection 43. The bores 45 serve to prevent the rotation of the reduction gear 7 while permitting the eccentric movement of the reduction gear 7 within a range the reduction gear 7 is allowed to move. Through this eccentric movement, the point at which the gearing portion 5 of the reduction gear 7 and the gearing portion 10 engage with each other is shifted so that the reduction rotating member 13 is rotated at a speed which is much lower than the rotation speed of the drive shaft 3. Attached to the bottom surface of the reduction rotating member 13 is a contactor 14 which slidably moves on the resistive element 17. The contactor 20 always makes contact with the contactor 14. The bearing portion 12 of the reduction rotating member 13 serves as a bearing for the drive shaft 3 as described above and it extends outwardly of the bearing 2 mounted on the insulating base 41. The rotation of the outwardly extended bearing portion 12 enables the coarse adjustment of the resistance value. Further, the reduction rotating member 13 is prevented from being rotated by the provision of a stop 22 on an outer periphery of the gearing portion 10 and a recess 46 at a portion of the case 1 which corresponds to the stop 22 so that the stop 20 abuts against the recess 46, thus permitting a rotation of about 300°.

The indication of the amount of rotation of the reduction rotating member 13 is accomplished by fitting a disk-shaped indicator 47 bearing indication symbols thereon, as shown in a fourth embodiment FIG. 13, into the bearing portion 12 on the bearing 2 and secured thereto.

In a fifth embodiment as shown in FIG. 14, a string 49 is tensioned between the bearing portion 12 and a separately formed guide roller 48 in a manner known in a dial indicator of a radio receiver set and a pointer 50 is attached to the string 49 and an indicator plate 51 is fixedly arranged at a position corresponding to a travel path of the pointer 50.

The operation of the present embodiment will now be explained.

As the drive shaft 3 is rotated, a plane in which the cam plate 4 of the drive shaft 3 and the recess of the reduction gear 5 make contact, that is, an outer circumferential surface which is farthest from a central axis of the drive shaft 3 traces a circle around the drive shaft 3, and through the above operation the reduction gear 7 is prevented from being rotated by the action of the projection fitted into the bore of the case 1. As a result the reduction gear 7 makes eccentric movement as shown in FIGS. 12A – 12D. By the eccentric movement of the reduction gear 7, the reduction rotating member 13 having the gearing portion 10 which engages with the gearing portion 5 of the reduction gear 7 is rotated. The diameters and the numbers of teeth of the gearing portion 5 of the reduction gear 7 and of the gearing portion 10 are different, and the point at which the gearing portion 5 and the gearing portion 10 engagement lies on an extension of a line connecting the center of the drive shaft 3 and the point of the cam plate 4 extending further outwardly so that the eccentric movement of the reduction gear 1 is transmitted to the reduction rotating member 13 as a rotating force. In this manner, the rotating force of the drive shaft 3 is transmitted to the reduction rotating member 13 through the reduction gear while the rotation speed is reduced such that the reduction rotating member 13 is rotated one revolution, that is, about 300° after the drive shaft 3 has been rotated 5–10 revolutions.

Further revolutions of the reduction rotating member 13 are prevented by the stop 22 of the reduction rotating member 13 and the recess in the case 1. As described above the contactor 14 attached to the reduction rotating member 13 which is rotated at a reduced rotation speed slidably moves on the resistive element 17 at a slow speed to permit the delivery of any desired resistance value across the terminals 18 and 19.

A coarse adjustment is accomplished by rotating the bearing 12 of the reduction rotating member 13 to allow the contactor 14 to sweep the resistive element 17 as fast as in a conventional variable resistor to attain rapid adjustment of the resistance value. An indicator plate may be provided to be operated in response to the operation of the reduction rotating member 13, in which case the amount of rotation of the indicator plate 47 in FIG. 13 or the position of the pointer 50 relative to the indication plate 51 in FIG. 14 provides the identification of the resistance value.

While the variable resistors have been explained in the preferred embodiments, it should be understood that the present invention can be equally applied to any sort of electronic component, such as a variable capacitor, which requires fine adjustment.

What is claimed is:

1. An electronic component having a fine adjustment mechanism comprising
   - a case including a side wall having a plurality of bores therein,
   - a drive shaft having an eccentric cam formed on a portion thereof, said drive shaft extending from said case,
   - a ring-shaped intermediate reduction member having a plurality of projections and a gear portion formed on the outer periphery thereof coupled to the eccentric cam on said drive shaft said plurality of projections fitting loosely into the plurality of bores in said casing thereby preventing rotation of said intermediate reduction member while permitting eccentric movement thereof,
   - a reduction rotating member having a gear portion formed on the inner periphery thereof coupled to a portion of the gear portion of said intermediate reduction member, the gear portion on said reduction rotating member having a diameter different from that of said intermediate reduction member, and,
   - an actuating member coupled to said reduction rotating member.

2. An electronic component having a fine adjustment mechanism according to claim 1 wherein a stop is formed on the outer periphery of said reduction rotating member, said stop abutting against said case to limit rotation of said reduction rotating member.

3. An electronic component having a fine adjustment mechanism comprising
   - a case including a side wall,
   - a drive shaft having an eccentric cam formed on a portion thereof, said drive shaft extending from said case,
   - a ring-shaped intermediate reduction member having a power transmitting portion formed on the outer periphery thereof coupled to the eccentric cam on said drive shaft, said intermediate reduction member being prevented from rotating but permitted to make eccentric movement,
   - a reduction rotating member having a power transmitting portion formed on the inner periphery thereof coupled to a portion of the power transmitting portion of said intermediate reduction member, said reduction rotating member having a diameter different from that of said intermediate reduction member,
   - a base coupled to said case,
   - a resistive element affixed to said base, and
   - a contactor coupled to said reduction rotating member, said contactor slidably moving on said resistive element while bridging said element.

4. An electronic component having a fine adjustment mechanism according to claim 3 wherein said case has a guide formed at a portion thereof, and said intermediate reduction member is formed with a projection which is fitted into said guide to prevent rotation of said intermediate reduction member but allow eccentric movement thereof.

5. An electronic component having a fine adjustment mechanism according to claim 4 wherein said reduction rotating member is formed with a stop on an outer periphery thereof, said stop abutting against the projection of said intermediate reduction member to prevent rotation of said reduction rotating member.

6. An electronic component having a fine adjustment mechanism according to claim 3 wherein said intermediate reduction member comprises a reduction gear having a gearing portion formed on an outer periphery thereof, and said reduction rotating member has a gearing portion of different diameter from that of said gearing portion of said reduction gear formed on an inner periphery thereof, whereby the gearing portions of both members engage with each other.

7. An electronic component having a fine adjustment mechanism according to claim 6 wherein said case is provided with a plurality of bores and said reduction gear is provided with a like number of projections loosely fitted into said bores, on a side facing said case.

8. An electronic component having a fine adjustment mechanism according to claim 7 wherein a stop is formed on the outer periphery of said reduction rotating member, said stop abutting against said case to limit rotation of said reduction rotating member.

9. An electronic component having a fine adjustment mechanism according to claim 6 wherein said reduction rotating member has a bearing portion fitted into a bearing formed on said base such that the end of the former extends outwardly of the latter, and said drive shaft is fitted into said bearing portion of said reduction member.

10. An electronic component having a fine adjustment mechanism according to claim 9 wherein said case has a guide formed at a portion thereof, and said reduction gear is formed with a projection which is fitted into said guide to prevent the rotation of the reduction gear but allow eccentric movement thereof.

11. An electronic component having a fine adjustment mechanism according to claim 10 wherein said reduction rotating member is formed with a stop on an outer periphery thereof, said stop abutting against the projection on said reduction gear to prevent the rotation of said reduction rotating member.

12. An electronic component having a fine adjustment mechanism according to claim 9 wherein said case is provided with a plurality of bores and said reduction gear is provided with a like number of projections loosely fitted into said bores, on a side facing said case.

13. An electronic component having a fine adjustment mechanism according to claim 12 wherein a stop is formed on the outer periphery of said reduction rotating member, said stop abutting against said case to limit rotation of said reduction rotating member.

14. An electronic component having a fine adjustment mechanism according to claim 9 wherein an indicator mechanism is linked to that portion of said reduction rotating member which extends outwardly of said bearing.

* * * * *